Feb. 6, 1951 J. E. KLEIN 2,540,124
PHOTOGRAPHIC APPARATUS
Filed June 17, 1947 8 Sheets-Sheet 1

FIG. 1

INVENTOR.
Joseph E. Klein,
BY William J. Wesseler,
ATTORNEY.

Feb. 6, 1951 — J. E. KLEIN — 2,540,124
PHOTOGRAPHIC APPARATUS
Filed June 17, 1947 — 8 Sheets-Sheet 2

INVENTOR.
Joseph E. Klein,
BY William J. Wesseler,
ATTORNEY.

Feb. 6, 1951          J. E. KLEIN          2,540,124
PHOTOGRAPHIC APPARATUS Filed June 17, 1947          8 Sheets-Sheet 3

INVENTOR.
Joseph E. Klein,
William J. Wesseler
ATTORNEY.

Feb. 6, 1951  J. E. KLEIN  2,540,124
PHOTOGRAPHIC APPARATUS
Filed June 17, 1947  8 Sheets-Sheet 4

INVENTOR.
Joseph E. Klein,
William J. Wesseler
ATTORNEY.

Feb. 6, 1951 J. E. KLEIN 2,540,124
PHOTOGRAPHIC APPARATUS
Filed June 17, 1947 8 Sheets-Sheet 6

INVENTOR.
Joseph E. Klein,
BY
William J. ＿＿＿
ATTORNEY.

Feb. 6, 1951  J. E. KLEIN  2,540,124
PHOTOGRAPHIC APPARATUS
Filed June 17, 1947  8 Sheets-Sheet 7

Patented Feb. 6, 1951

2,540,124

UNITED STATES PATENT OFFICE 2,540,124

PHOTOGRAPHIC APPARATUS

Joseph E. Klein, Cleveland, Ohio

Application June 17, 1947, Serial No. 755,213

3 Claims. (Cl. 95—14)

This invention, as indicated, relates to a photographic apparatus. More particularly, it comprises a photographic apparatus adapted to expose, develop and deliver photographs automatically. The invention also includes a means of producing photographic identification records at low cost and with high efficiency. More particularly, the invention is especially adapted for the taking, developing and finishing of a portrait of an individual together with certain identification indicia in a minimum of time and with dependable results whether operated for individual photos or on a quantity production basis. The invention includes the taking of successive camera photos and contact prints on strip material and developing the same as positives. It also includes the identification of portraits by means of personal data and individual markings whereby the photograph may be definitely identified through such markings at a plurality of points of identification.

The principal object of the present invention is to provide a photographic apparatus adapted for the rapid production of portraits singly or in succession and finishing the same in a uniform dependable manner within the apparatus.

Another object of the invention is to provide a means for producing identification records including a portrait and individual verification markings whereby verification can be had with a minimum of cost and complication.

Another object of the invention is to provide an automatic apparatus adapted to make successive portraits of individuals and record indicia for identification purposes in integral association therewith.

Another object of the invention is to provide for an identification record wherein a portrait is supplied together with matter added, through contact printing, whereby a single identification unit supplies a number of identification items subject to immediate and positive verification in addition to the photograph.

Another object of the invention is to provide an improved automatic photographic developing unit wherein dependability of treatment of the exposed print is assured and whereby a large number of prints may be finished at low cost and with high quality results, and delivery of the finished prints made in a matter of seconds.

Another object of the invention is to provide an automatic photographic apparatus adapted for the rapid production and delivery of identification units in quick succession for a large number of individuals without frequent reloading of such apparatus with sensitized material and developing and finishing solutions.

Another object of the invention is to provide a series of automatic control cycles for the setting and exposing of sensitized material in successive units and transferring the same in sequence to an automatic finishing apparatus adapted to maintain the operation until the last unit is finished and delivered.

Other and further objects of the invention will appear in the course of the following description.

To the accomplishment of the foregoing and related ends, said invention, then, consists of the means and method hereinafter fully described and particularly pointed out in the claims, the annexed drawings and the following description setting forth in detail certain mechanism embodying the invention, such disclosed means and method constituting, however, but several of various forms in which the principle of the invention may be used.

In said annexed drawings:

Fig. 8 is an enlarged fragmentary view of the central portion of the structure illustrated in Fig.

1, showing one of the spray nozzles and associated mechanism in operative running position;

The apparatus may be briefly described from the standpoint of structure as comprising a unit 1 adapted to be placed in a booth having adequate illumination over the seat or position provided for the subject of the portrait and having the lens at a suitable distance from such position for satisfactory depth of focus for a fast anastigmatic lens which is desirable for rapid and well-defined portraits. As illustrated, a supporting frame 2 has a lower platform 3 carrying a motor 4 and air pump 5 and an upper structure 6 of a bowl-like form providing a developing and finishing chamber 7. This chamber is preferably provided at its lower portion with a funnel-shaped drain 8 through which liquids together with absorbed gases may be discharged into a suitable receptacle, or other means of disposal.

In a housing 9 above the developing and finishing chamber photographic control mechanism is positioned.

Before describing the elements contained in the lower and upper casings it might be mentioned that the function of the upper mechanism is to supply units of sensitized material, which have been properly exposed, to the lower mechanism which automatically carries out with each unit transferred to it, a full cycle of developing and finishing operations. It should also be explained at this point that while one cycle of finishing a print is under way in the lower mechanism, it preferably has capacity for receiving a number of exposed but undeveloped units at one time. In the present case four such units may be in course of being finished at one time.

The power from the motor is applied continuously to the mechanism in the developing and finishing chamber and also is transferred from this mechanism to the supply roll of sensitized material to feed and position the same preliminary to exposure, and to transfer previously exposed units to the developing and finishing chamber, and to set the mechanism in this chamber to carry out its cycle for each unit so transferred.

*The loading cycle*

The power from the motor is also used to drive directly the control mechanism for exposing the area of sensitized material for a portrait accompanied by identification indicia successively exposed and for timing any subsequent operations of the same character on another subject for a portrait so that this later exposed unit will be received in its proper place in the development and finishing cycle without in any way interfering with the cycle in course of completion on the earlier exposed unit or units as the case may be. This series of operations may be designated the "loading cycle," since by this means, acting at fractional intervals of fixed ratio to the developing and finishing cycle, the last mentioned cycle can be loaded to capacity whenever the number of subjects to be photographed requires it. As stated, the limiting factor is the time involved in having the subjects take their proper position before the lens rather than any lack of speed in the photographic process, or the print finishing process.

The portrait is taken in the conventional manner. The subject is posed before the lens at a position wherein lighting and focus are prearranged. In the event it is desired to provide individual personal data on the card bearing the portrait a negative in the camera chamber provides a form with spaces in which may be inserted the signature, thumb print, serial number and personal description of the subject after the portrait is delivered to the person photographed. The method of adding this form for such data to the portrait card by contact printing will be presently described. The use of such data permits the distribution of sheets bearing the same, to various identification stations in more compact form and at less expense than where portraits and full personal data have to be duplicated for verification purposes.

Figure 2:
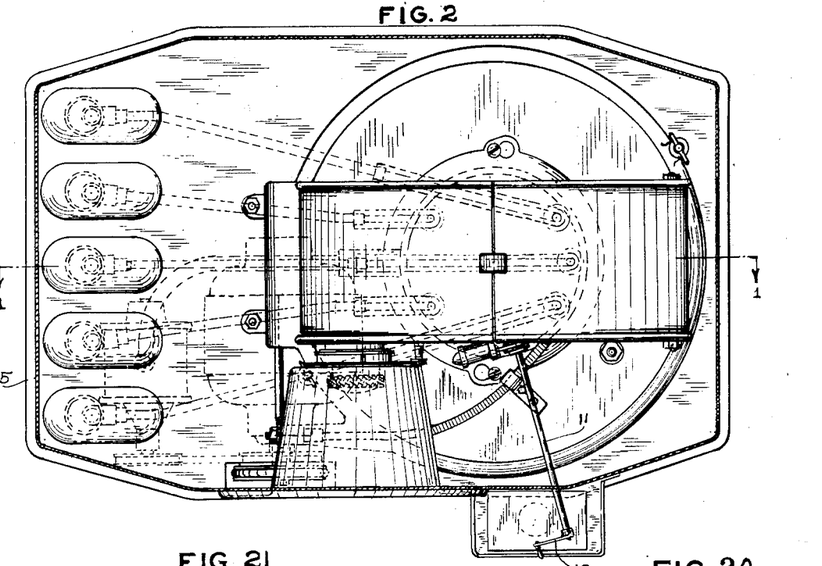
Fig. 2 is a top plan view of the structure shown in Fig. 1, as seen along the line 2—2, looking in the direction of the arrows.

When the subject is properly posed, the turning of the starting lever 10 (Figs. 2, 3, 4) sets the entire mechanism in operation, making the exposure for the portrait, the exposure for the contact print, and initiating the development and finishing operations, concluded with the discharge of the finished identification card or unit.

Figure 4:
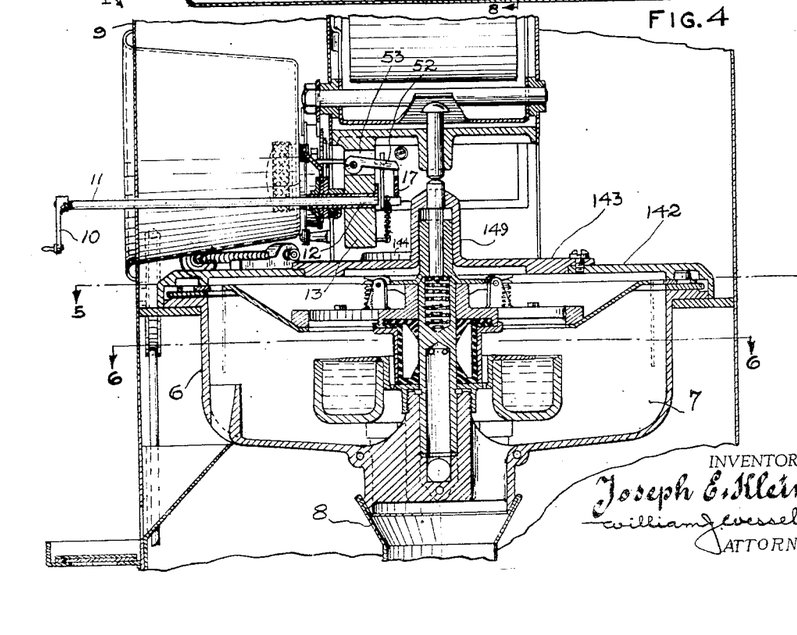
Fig. 4 is a vertical sectional view of the structure shown in Fig. 3, as seen along the line 4—4 looking in the direction of the arrows.

The starting lever shaft 11 is engaged within the tube or sleeve 12, as shown in Fig. 4, the tube being supported in the post 13. The tube 12, it will be noted, is cut away at one side to provide an arc of movement for a lever plate 14 secured to the shaft 11, said plate carrying an extension 15 with a roller contact 16. The roller contact 16 bears frictionally against the under side of a lever 17 (see Figs. 9, 16 to 18), said lever being carried on a pivot 18 on the end of a link 19 keyed to the pivot 21 which supports the paper operating bar 22. The lever 17 has a pivoted hook portion 23 formed as an extension with a restricted range of movement, the hook portion being held at its upward limit of movement by a spring 24 secured to an extension arm 25 at one end and to a fixed hook 26 on the wall of the camera casing hereinafter to be described. The tube or sleeve 12 is provided with a flange 27 in the plane of the member 14 heretofore mentioned and carries an extension member 28 for the control of the mercury switch 30.

Figures 16, 17, 18:
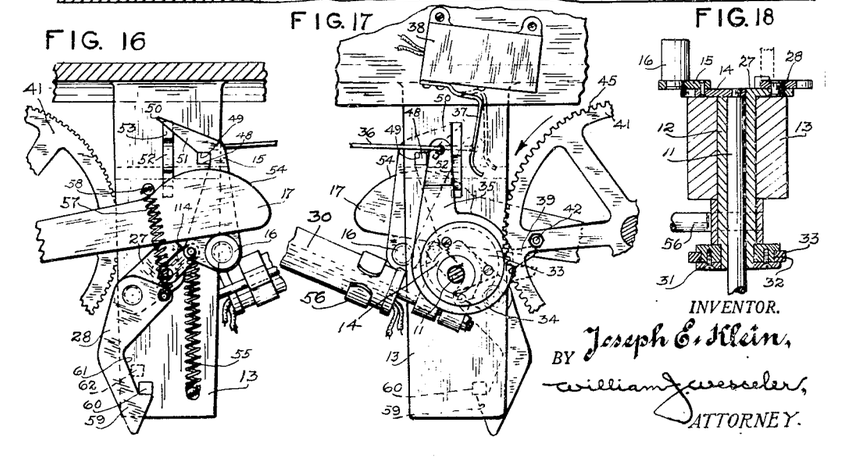
Fig. 16 is an enlarged view of a portion of the control mechanism illustrated centrally in Fig. 9, the mechanism being shown in cocked or operative position.
Fig. 17 is a view of the structure shown in Fig. 16 as seen from the opposite side of said mechanism.
Fig. 18 is an enlarged sectional detailed view, as seen along the line 18—18 shown in Fig. 10 looking in the direction of the arrows.

By reference to Fig. 18, it will be noted, that the outer end of the sleeve or tube 12 is of reduced diameter and supports thereon a collar 31 provided with a circumferential groove 32 with an eccentric 33 supported in said groove, the collar being formed in two parts to permit such engagement, as shown in Fig. 18. The eccentric provides a hub for a rotatable plate 34 having an extension arm 35 with an eyelet adapted to be engaged by the shutter actuating cord 36. The extension arm is above the position of the starting lever shaft 11 and when actuated in the direction to trip the shutter its further movement in such direction serves to contact a switch arm 37 closing the circuit of a light switch 38 mounted immediately above the path of movement of the extension arm. The light switch energizes the light in the contact print compartment, presently to be described. The means for moving the rotatable plate comprises an operating arm 39 at substantially right-angles to the extension arm 35 heretofore referred to.

Figure 10:
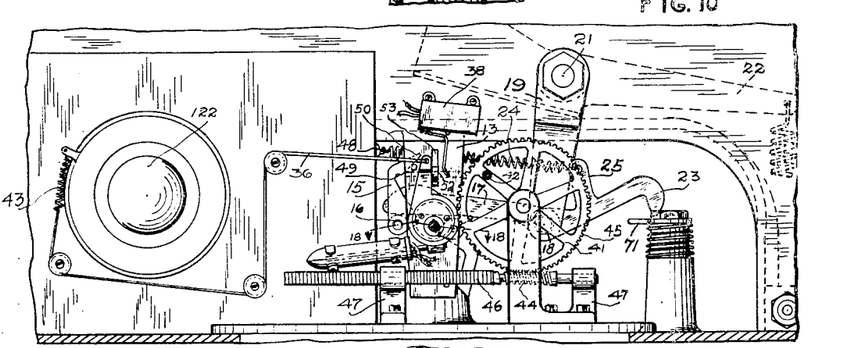
Fig. 10 is a fragmentary view in elevation of the mechanism shown in Fig. 9 as seen from the opposite side of such apparatus.

The shutter is operated in predetermined timed relation by means of the controlling wheel 41 carrying a roller contact 42 on one spoke spaced from the periphery of the wheel a distance adequate to contact the arm 39 when set across its path to move the plate through an arcuate movement whereby it contacts the light switch heretofore described, whereupon the arm 39 moves out of the path of said roller, and the spring 43 on the shutter cord returns the plate to its original position. It should be stated that the operating arm 39 will only be in a position to be contacted by the roller when the mechanism is in cocked or operating position, as shown in Fig. 17, when the eccentric forces it to one side of the starting shaft and brings it in line with the roller 42. The inactive position of the shutter and starting switch are shown in Fig. 10.

The operation of the shutter and contact print lamp is dependent solely on the movement of the controlling wheel 41 with its actuating roller 42. This wheel is driven (Figs. 9 and 10) by a worm 44 engaging the teeth 45 on its periphery, the worm being operated through a flexible shaft 46 supported in brackets 47 and connected with the main drive shaft presently to be described.

Figure 9:
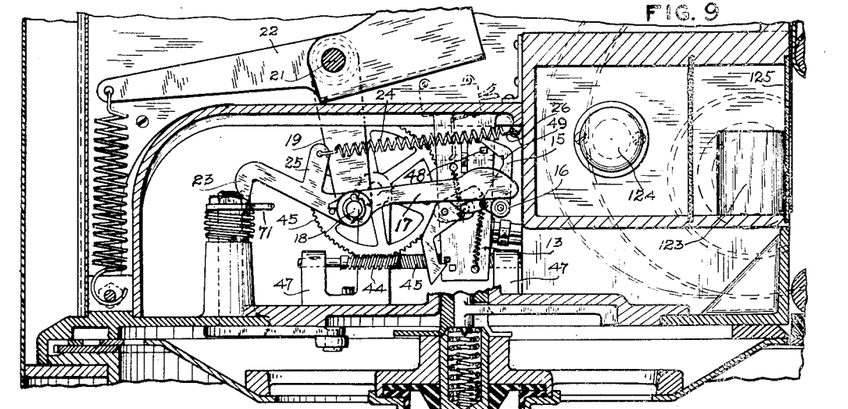
Fig. 9 is an enlarged fragmentary view of a portion of the control mechanism illustrated in Fig. 8, the mechanism being in the off, or inoperative position.

When set in cocked position, as shown in Fig. 9, the plate 15 will ride above the squared lug 48 on the post 13 and its shoulder 49 will temporarily hold the arm 17 in raised position. It will be noted that the extreme end 50 of the plate 15 beyond the shoulder 49 presents a cam face 51 on its underside adapted to trip the plate from its locked position when contacted by a releasing arm 52 projecting through a slot 53 in the post 13 and actuated by a cam surface 54 on the upper portion of the lever 17 associated with the paper feeding mechanism. A spring 55 secured to the lower portion of the post 13 restores the parts to their original position when the releasing action takes place.

The sleeve 12 and its associated parts is moved by the lever plate 14 through the shoulder contact to cocking position for the mercury switch 30 carried on the bracket 56 clamped to the sleeve 12, and is held in such position against the tension of the retracting spring 57 secured to the extension plate 28 and to a fastening 58 on the post 13. The free end of the plate 28 is formed as a hook 59 which engages a squared lug 60 adjacent the lower end of the port 13. The inner edge 61 of the hook is formed as a cam surface which bears against a latch squared bar 62 slightly above and to one side of the lug 60.

When the extension plate is moved downwardly through the movement of the controlling wheel 41, and the eccentric 33, it will be cammed out of contact with the lug 60 and will engage the lug 62. This action transfers the control of the mercury switch 30 from the temporary initial action of the sleeve 12 to the developing and finishing mechanism which will be in action at such time, as will be hereinafter described. This temporary control as above explained permits the making of the exposure and the feeding of the identification unit and starting the developing and finishing cycle for such unit preliminary to having such cycle control the switch operation and cut-off.

Figure 8:
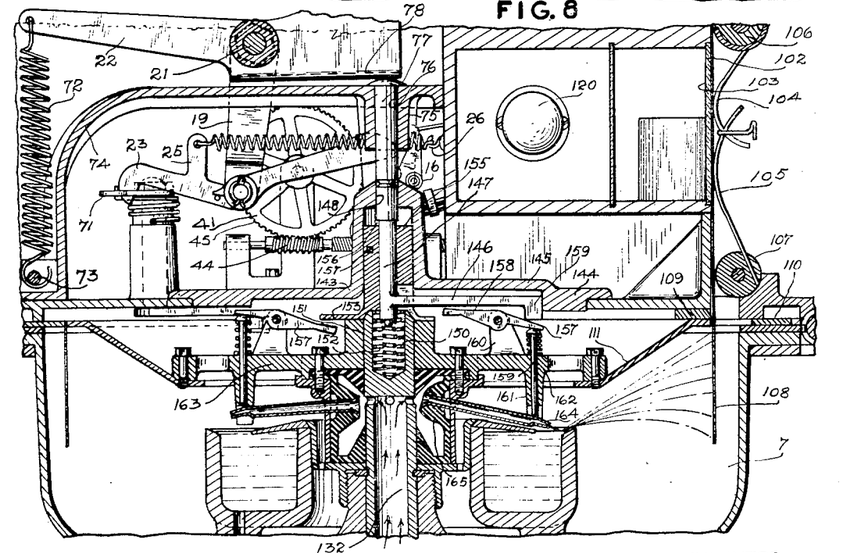

When the handle 10 is turned to engage the hook portions of the plates 15 and 28 upon their respective lugs 48 and 60 the roller 16 will elevate the lever arm 17 which will depress the pivoted hook extension 23 bringing it into the path of movement of the oscillating arm 71. This oscillating arm 71 is moved over an adequate path of movement by cam members associated with the ring gear of the developing chamber presently to be described. When the hook extension 23 is in its lowered position the oscillating arm 71 moves the hook 23 and its associated mechanism to the position illustrated in Fig. 8, whereby the paper feeding lever or operating bar 22 is pulled downwardly by the link 19 against the tension of the spring 72 anchored to the end of the lever and at its opposite end to the pin 73 on the casing for the control mechanism 74. The casing 74 is provided with a boss 75 on the central axial line of the apparatus and is provided with an aperature 76 within which a control pin 77 is slidingly engaged. The operating bar 72 is provided with a pin contacting extension 78 which is shown in operative position in Fig. 8 and in upraised inoperative position in Fig. 1. When the pin 77 is depressed it will set in operation the developing and finishing mechanism as will be hereinafter described in detail. The paper feeding lever or operating bar 22 has a pair of angularly extending arms 79 above the extension 78 heretofore described and these arms support a pair of brackets 80.

*The sensitized paper control*

The identification record, as has been indicated, is made upon a card detached from the roll of sensitized material after the exposure has been made and thereafter developed and finished as a separate unit.

The angular extension arm 79 carrying the brackets 80 above which brackets in alignment with the arms, a pair of rollers 81, 82, are supported on short pivoted links 83, 84, drawn toward each other by means of a tension spring 85. The rollers are designed to frictionally engage the paper on opposite sides and bodily pull the paper downwardly from the supply on the roll a distance sufficient to provide an exposure area at the free end, of the predetermined size of the card. The inner roller 81, it will be noted, is provided with a gear wheel 86 at one end which rides upon the teeth 87 of a rack bar 88 which is clamped in adjustable position to the inner face of the casing by means of a stud bolt 89 and wing nut 90. A thin metal plate carrying a suitable scale 91 is engaged over the stud bolt and an embossed area on the casing and is movable with the stud bolt as it is adjusted in the slot 92. The arrow 93 embossed, or otherwise affixed to the casing, will serve as an indicator to provide for accurate adjustment of the rack bar. The rack bar is pivotally supported on the stud bolt, and its free end opposite the rack portion is engaged by a tension spring 94 anchored at its opposite end to a pin 95 on the casing of the apparatus. A pawl 96 having a spring 97 permits the rollers to ride freely over the paper strip between the same on the up-stroke, but causes said rollers to have feeding action upon the paper on a portion of the down-stroke when the roller is in engagement with the rack. The paper strip will thus be fed downwardly a distance somewhat greater than the throw of the angular extension arms 79 in a downwardly direction and be withdrawn upwardly a portion of this distance to be in registry with the exposure opening in the camera and contact printing chambers as will be hereinafter described.

Figures 11, 12, 13, 14, 15:
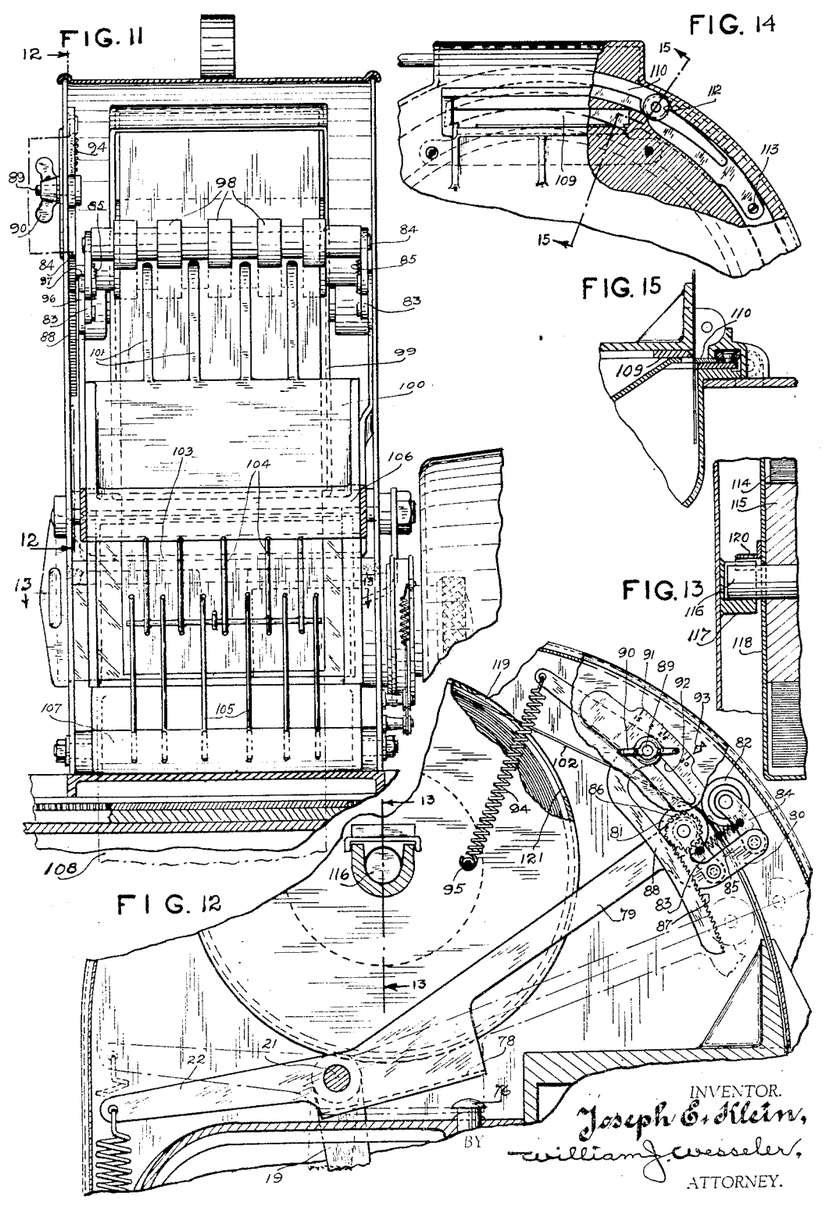
Fig. 11 is an elevation of the feeding and guiding mechanism for the sensitized paper, as seen along the line 11—11, shown in Fig. 1.
Fig. 12 is a fragmentary view of the structure shown in Fig. 11, as seen along the line 12—12 looking in the direction of the arrows.
Fig. 13 is a fragmentary detailed view of the support for the roll of sensitized material, as seen along the line 13—13 shown in Fig. 12.
Fig. 14 is a fragmentary plan view, partly in section, of the identification card and clamping mechanism.
Fig. 15 is a fragmentary sectional view of a portion of the mechanism illustrated in Fig. 14, as seen along the line 15—15, looking in the direction of the arrows.

The rollers feeding the paper may be formed with a plurality of enlargements 98 of rubber or other suitable material and the paper may be held in smooth contact with its slideway 99 by means of a plate 100 having a plurality of spring fingers 101 on its upper margin, as shown in Fig. 11. The paper strip 102 adjacent the exposure aperture may be held firmly against the glass 103 by means of a plurality of spring fingers 104, 105, carried on spring pressed rollers 106, 107. The extreme lower end 108 of the strip material which has been exposed (Fig. 8) when fed downwardly will enter the developing and finishing chamber 7.

Adjacent the upper margin of the chamber 7 a horizontal knife 109 is provided against the sharp edge of which the exposed card unit is forced by means of a pivoted clamp 110 of arcuate outline, as seen in plan, (see Fig. 14), which after severing the exposed area holds the same firmly by its extreme upper edge between the margin of said clamp and the adjacent curved edge of the rotating member 111 of the developing and finishing unit.

As soon as the paper is severed by the action of the clamping member 110 riding against a cam shoulder 112 formed on the walls of the casing which moves the clamping member around its pivot 113, the remainder of the paper strip and its associated rollers will be free to return to their original position subject to the release of the action of the operating arm 71 from its extreme point of oscillation accompanied by the release of the hook extension 23 on the lower arm 17. When so released the lower end of the strip of paper will be held in accurate registry with the exposure aperture in the camera and printing chambers and will be ready for the next exposure.

It will be noted that a large roll of sensitized material 114 is supported on a spool 115 (see Figs. 12, 13) engaged on a shaft 116 supported in trunnion bearings 117 enclosed within a light-proof container 118 centrally of which the shaft 116 is engaged, the ends of the shaft projecting at each side and being supported beneath the bracket members 120. The paper emerges from the container through an aperture 121 slightly above the normal position of the angularly positioned arms 79 heretofore referred to.

The camera and contact print device

Figure 20:
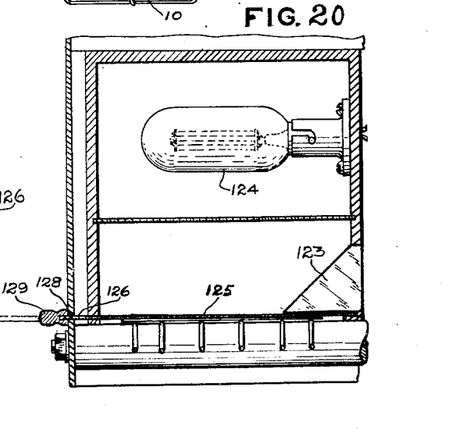
Fig. 20 is an enlarged detailed view, partly in section, of the contact printing apparatus illustrated in Fig. 3.

As has been explained, the apparatus is adapted to take a portrait, and is also adapted to add photographically to the sensitized material upon which the portrait is made, certain identification indicia or the like by means of a contact printing process. The photograph is preferably taken in a camera chamber by means of a lens 122 of suitable character preferably acting through a prism 123. Immediately after the portrait is taken an electric bulb 124 is energized by the switch 38 heretofore referred to and an exposure is made of the identification indicia through the negative 125, shown in Figs. 3 and 20 more particularly.

Figure 21:
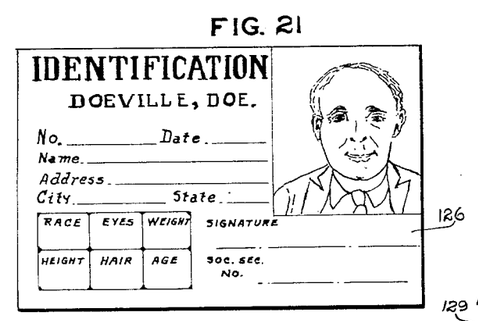
Fig. 21 is a face view of a unit of sensitized material after the same has been finished and presenting a portrait together with identification indicia.
Figure 22:
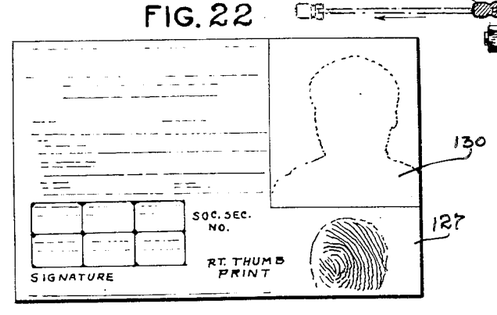
Fig. 22 is a face view of an alternative form of sensitized unit.

The identification indicia may be in the form of a negative 126 of the type shown in Fig. 21, which is a permanent negative showing printed matter with spaces adjacent thereto for the entry of certain data transferred to the sensitized material photographically, or it may be in the nature of an individual negative 127 of the type shown in Fig. 22 wherein the applicant has supplied his signature to such negative as well as his thumb print and a serial number, such as his social security number or the like. This individual negative may be provided in the form of a slide engaged through a slot 128 and preferably has a light excluding strip 129 along its margin after the manner of a photographic slide in a plate holder.

The negative 127 would be blank over the area 130 covered by the portrait, but the remaining data could be reproduced at low cost in a rapid printing apparatus and copies of the prints thus made distributed to stations wherein identification of the individual would take place. Thus, reproduction could be made more rapidly and at much less expense than portrait reproductions and would afford adequate verification means for the positive identification of the individual photographed.

The developing and finishing cycle

Figure 1:
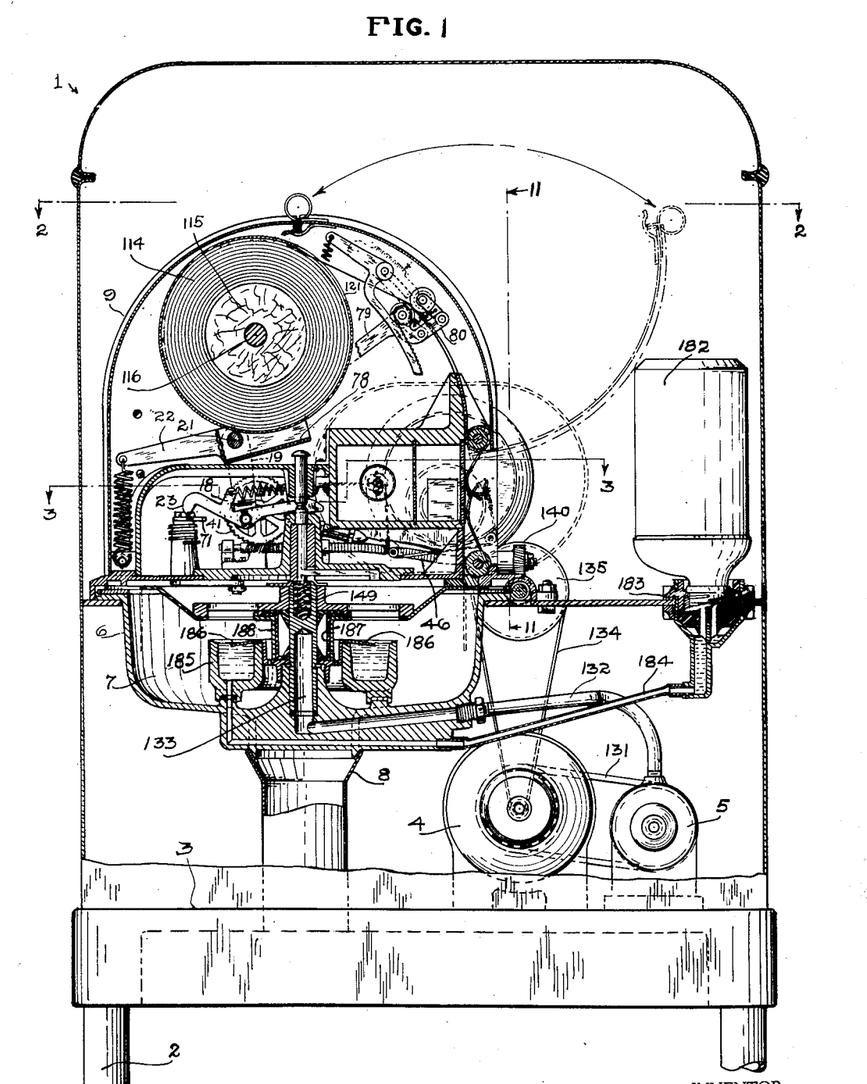
Fig. 1 is a central vertical sectional view of a photographic unit mounted in a casing supported on suitable platform standards, the casing being broken away in part, as seen along the line 1—1, shown in Fig. 2 looking in the direction of the arrows, certain parts not in the plane of the section being omitted in the interest of clearness of the disclosure.

As is clearly shown in Fig. 1, the motor drives a pump 5 through a belt 131, the air pump supplying air through a duct 132 to a passageway 133 on the central axial line of the apparatus. The motor also drives through a belt 134 and a pulley 135, a shaft 136 having a worm 137 (see Fig. 5) engaging peripheral teeth 138 on the ring gear 139. The shaft also has a worm wheel 140 engaging a worm 141 at the end of the flexible shaft 46 heretofore referred to. The shaft engages through and is supported within an extension 142 of the adjacent casing at a point in alignment with the housing for the sensitized strip material heretofore referred to. The upper plate 143 of the housing provides a support for the control mechanism heretofore referred to and has a central portion 144 with a radial enlargement 145 within which an operating bar 146 is engaged, said operating bar being connected at its inner end with a spring-actuated plunger 147 positioned on the axial line of the apparatus and slidingly engaged in an axial opening 148 in a central tubular extension 149 formed on the plate 143.

Figure 3:
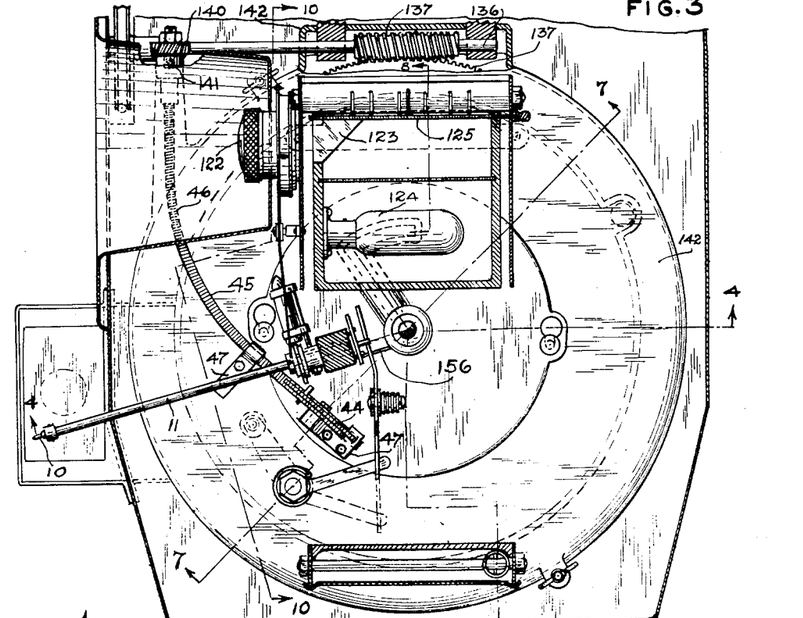
Fig. 3 is a top plan view, partly in section, of the photographic and control mechanism, as seen along the line 3—3 shown in Fig. 1, looking in the direction of the arrows.
Figures 6, 19:
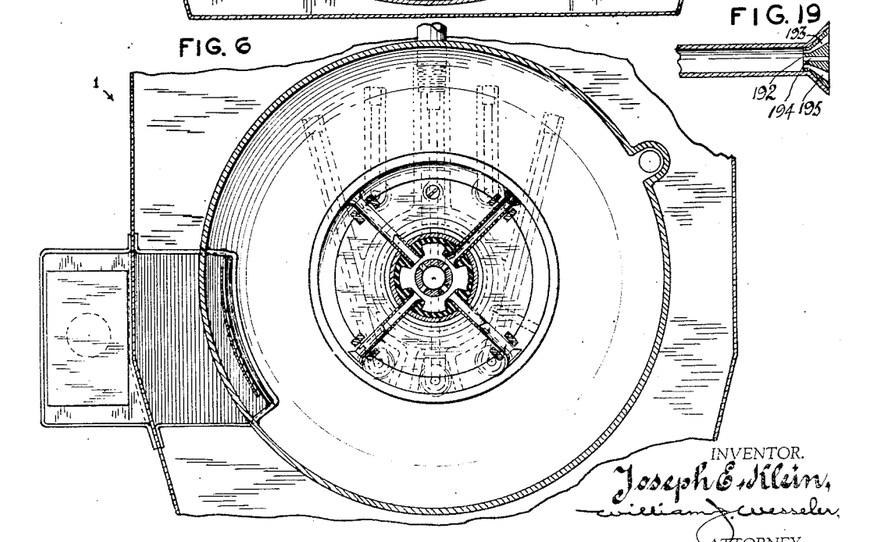
Fig. 6 is a plan view of the structure shown in Fig. 4, as seen along the line 6—6 looking in the direction of the arrows.
Fig. 19 is an enlarged sectional detailed view of one of the nozzles shown in Fig. 6.
Figure 7:
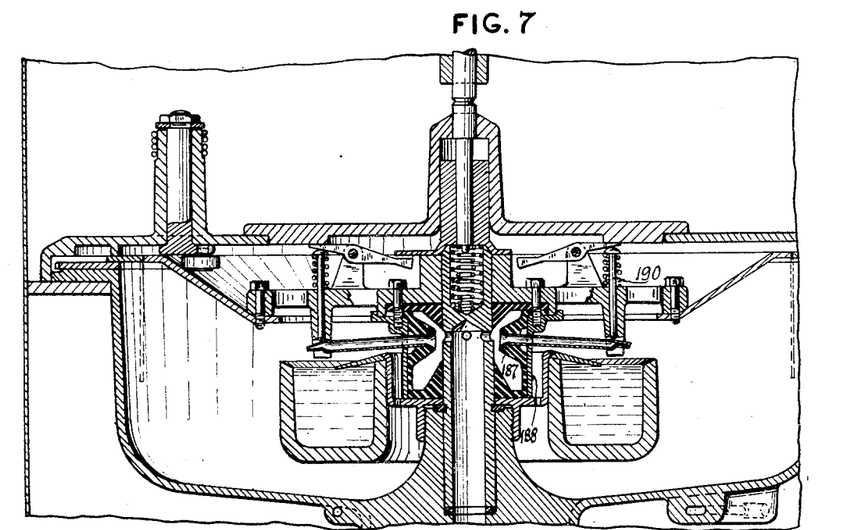
Fig. 7 is an enlarged fragmentary vertical sectional view of the developing and finishing unit and associated mechanism, as seen along the line 7—7, shown in Figs. 3 and 5 looking in the direction of the arrows, the apparatus being in inoperative position.

The upper end of the plunger is adapted to be contacted by the control pin 77 and depressed into operative position when the sensitized paper operating bar 22 depresses said control pin 77. A spring 150 immediately beneath the central extension of the plate 144 serves to press the plunger 147 in an upward direction. Another spring 151 is housed within the recess of the central support 152 positioned along the vertical axis of the apparatus and serves to move a plate 153 having a central enlargement 154 in an upward direction. The central enlargement of this plate is provided centrally with an opening engaged over a plunger 147 and has a cutaway portion 155 at one side of the enlargement on the plate adjacent the position of the operating bar 146. The plunger 147 has a shoulder 156 adjusted to bear on the upper surface of the enlargement 154 when the plunger is depressed. The enlargement adjacent its upper central portion carries at one side a square latch bar 62, which as shown in Fig. 3, projects adjacent the lug 60 in a position to contact and release the plate 28 holding the mercury switch in operative position. This plate 153 and its enlargement 154 is held depressed against the action of its spring 151 by means of nozzle operating levers 158, the inner ends of which engage above the plate 154 when the developing cycle is initiated for any single identification unit placed within the developing and finishing chamber. The means for placing the levers 156 above the plate 153 comprises an enlargement 159 on the operating bar 146 heretofore referred to. The enlargement, as is shown in Fig. 6, depresses the lever 158 which is pivotally supported on a standard 160 and bears at its forward end against the upper end of a spring-pressed plunger 161 supported in a tubular opening 162 in a revolving plate 163 within the developing and finishing chamber. The lower end of the plunger bears against a nozzle 164 flexibly supported in a rubber housing 165 communicating through the central standard 152 with the pressure air within the conduit 132 heretofore referred to.

In the apparatus herein illustrated, five nozzles and five mechanisms for operating the same are disclosed, but it is understood that a larger or smaller number of nozzles than shown may be utilized in accordance with the special requirements of the apparatus.

Figure 5:
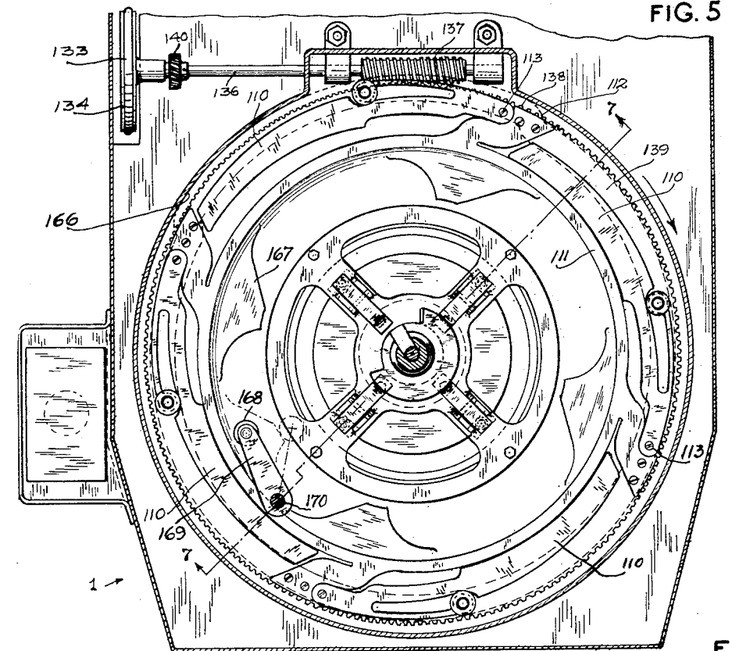
Fig. 5 is a plan view of the structure shown in Fig. 4, as seen along the line 5—5 looking in the direction of the arrows.

The plate 154 does not revolve, but the plate 163 turns axially around the standard 152 being operated by means of the ring gear 139 heretofore referred to. The ring gear, as is shown in Fig. 5, is provided with four clamping members 110, each having a roller actuated by the cam surface 112 heretofore referred to, which extends over the greater area of the casing for the gear and terminates at a releasing area 185 (see Fig. 5) where the finished print is released and discharged.

The ring gear 139 carries a rotor or cam plate 166 having four cams 167 at equally spaced positions immediately beneath the cover plate 143. These cams are engaged by a roller 168 on a lever arm 169 connected with the shaft 170 within the tubular post 171. At the upper end of the shaft 170 the oscillating lever 71, heretofore described, is mounted. The cam roller 168 is held in contact with the cam track by means of a coil spring 172 having one end anchored to a socket in the post 171, and the other end engaged with the oscillating lever 71. The oscillating lever 71 is actuated four times for each revolution of the ring gear 139. It moves idly if the hook extension 23 is in elevated position, but when the hook extension 23 is in its path of movement it actuates the sensitized paper feed mechanism to carry through the steps heretofore described of moving the exposed area of sensitized material into the path of the adjacent cutting and clamping bar in the developing and finishing chamber. After its maximum downward movement it retracts the extreme end portion of the roll to a position in alignment with the exposure opening of the camera and contact print chamber to sever the exposed print and transfer it to the developing and finishing mechanism. It also presses the operating pin 76 downwardly bringing the nozzle 164 into action, and holding down the control plate 153 by means of the lever 158 riding on the top surface thereof. The contact plate 153 while held down prevents the mercury switch being turned to current interrupting position, and thus any one of the four levers 158 can keep the apparatus in operation until the developing and finishing cycle is complete.

The developing and finishing cycle is thus carried on individually for each identification unit detached after the exposure and transferred to the developing and finishing chamber.

The unit when clamped by its upper edge between the clamping bar 110 and the margin of the plate 111 will be moved continuously past the eight compartments of the reservoir 181 for the developing and finishing solutions, receiving in turn a film bath from each compartment successively of developing solution, washing solution, fixing solution, washing solution, clearing solution, washing solution, sepia tone solution and final washing solution. A single inverted flask may be connected by a manifold distributor to each water compartment intermediate the other solutions referred to. The solutions just mentioned are suited to the development and finishing of what are known as positive prints but obviously other sensitized material and other finishing chemicals and washes may be used in the apparatus for developing either positives or negatives as may be required for any particular procedure.

Each compartment of the reservoir is supplied with the proper liquid bath from an inverted bottle or flask 182 with a constant level liquid seal 183 by its individual conduit or manifold 184 with its respective compartment or compartments 185. The reservoir is preferably formed of suitable acid resistant material and each compartment is provided with a partial cover member 186 over which the nozzle or nozzles ride as they travel opposite their exposed photographic prints, respectively around the circuit of the developing and finishing chamber. Each nozzle is flexibly held in the central rubber junction box 187 enclosed in the metal casing 188 through slots in which the nozzles are engaged, when the pump 189 is in action. A stream of air issues from each nozzle continuously whether the same is in active or inactive position. If desired, the air stream can be cut off from the inactive nozzles by placing a valve beneath each pin 190 which valve opens when the pin is depressed and the nozzle moved into film projecting position.

The nozzles when in lowered position cause air to bodily strike the top surface of the adjacent liquid bath and project a thin web or liquid film against the unit under course of development. The preferred nozzle tip is shown in Fig. 19 and has a flat flared terminal portion 191 into which a plug 192 having three passageways 193, 194, 195 is firmly secured by welding, brazing or other means. This structure projects a thin sheet or web of liquid and forms a liquid film on the print.

By using different types of nozzle apertures and compartment structure and various angles of impingement of the air jet on the liquid, the proper amount of developing or finishing solution can be transferred to the unit, the excess liquid being discharged into the bottom of the bowl and then disposed of. The lip of each compartment is preferably beveled but may assume various forms for different areas of coverage. The compartment may also have a flat trough about its margin where larger prints are to be covered with solution in a somewhat copious amount.

After the unit has received its succession of liquid baths through the action of its companion nozzle it has substantially completed the circuit of the chamber and the movable clamping member 110 is moved to releasing position by its spring and roller riding off the elongated cam area 196 into the pressure free area 197 of the circuit of the ring gear. When the unit is released as a finished print it falls by gravity through the opening 198 (see Fig. 4) upon a slideway 199 and is delivered into a receptacle 200 on the outside of the casing.

The cycle is terminated when the last unit is discharged, as stated, and the lever 201 holding the nozzle depressed rides over the edge of the plate 153 into the notched or cut-away portion 202 thereof. The plate 153 and its cylindrical enlargement 154 then are forced upwardly by the spring 151 and the hook plate 28 moves the mercury switch mechanism associated therewith to inactive position.

The apparatus while carrying out a succession of interrelated functions in timed co-operation, is made of parts adapted to be made inexpensively on a quantity basis. These parts are of rigid, dependable construction and have long service life.

The supplies of sensitized paper and developing and finishing material are adequate for a large number of photographic prints, and the apparatus is well adapted for volume output when an emergency arises for producing such prints in a minimum period of time.

The full capacity of the machine need not be used if less extended use is in view and a single portrait can be produced if desired without any identification data by substituting a narrow roll of sensitized paper for the wide roll otherwise installed, or by any other suitable procedure.

Certain features of the apparatus are adapted for independent use or for use with other types of apparatus and it is not intended to restrict the scope of this application as to any features to which the claims relate.

The apparatus heretofore described is intended particularly for photographic identification records for high speed operating on a quantity production basis. However, as indicated, the apparatus is also adapted for self-portraiture as a coin-operated mechanism, and as such is convertable so as to be used solely for portraits or to be used with identification data similar to that heretofore described.

Figure 23:
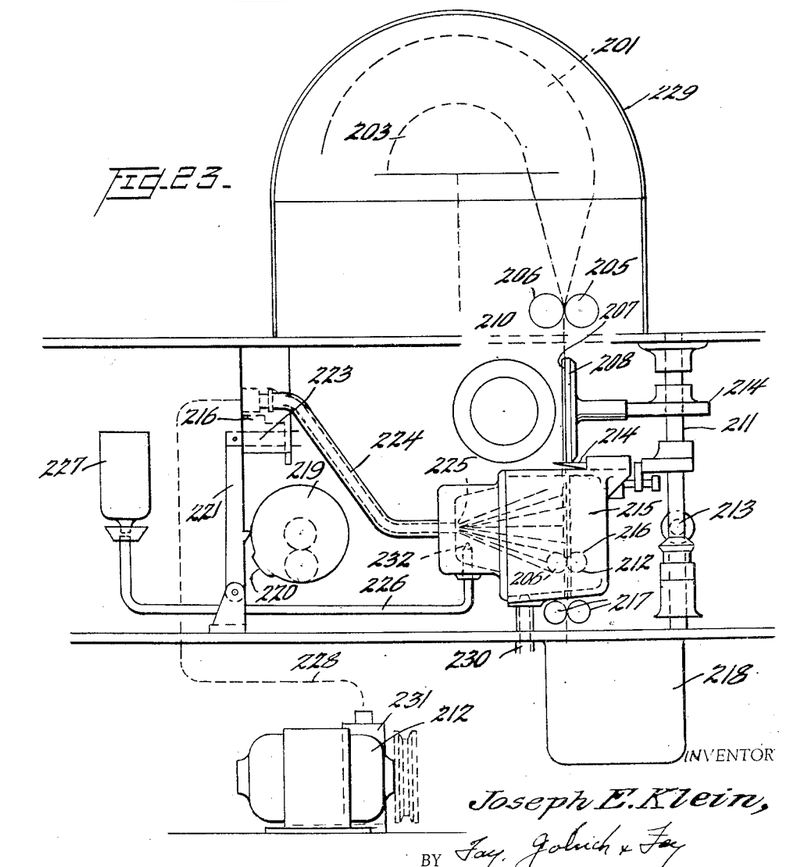
Fig. 23 is a central vertical sectional view showing a self-portraiture apparatus operable with or without identification data.
Figure 24:
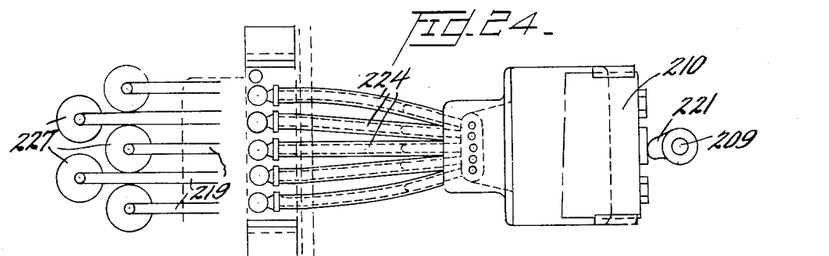
Fig. 24 is a horizontal sectional view of the structure shown in Fig. 23, as seen along the line 24—24, looking in the direction of the arrows.

When used for self-portraiture, with or without identification data, the apparatus may be greatly simplified in its construction, as clearly shown in Figs. 23 and 24 of the drawings. It will be noted that the roll of sensitized paper 203 is rotatably supported above the top wall 204 of the casing, and is fed downwardly between a pair of feed rolls 205—206 behind a glass plate 207, against which a paper clamping pad 208 is adapted to be pressed through the operation of a cam member 209, positioned rearwardly thereof. A negative providing identification data may be inserted against the glass plate on the side opposite that of the sensitized paper, and the flashing of a light within the exposure chamber 210 will transfer such data to the sensitized paper adjacent the position of the portrait, in a manner similar to that heretofore described.

A vertical shaft 211 is driven by a motor 212 through a jack shaft 213. The jack shaft also drives mechanism to start and stop the apparatus and to operate the camera shutter and to flash the light in the exposure chamber to make the contact print on the sensitized material adjacent the position of the portrait.

The motor 212 is located in the lower portion of the casing, and the vertical shaft 211 is provided with a series of cam members and gears for driving the feed rolls and operating the essential elements of the apparatus, including the paper clamping pad 208, above referred to, and also a cut-off knife 214, which severs the exposed portion from the continuous roll of sensitized material, which after development has been fed downwardly by the feed rolls into the developing chamber 215, its lower edge being held by the auxiliary rolls 216, and later, after development is fed to the discharge rolls 217, which deliver it to the finished picture receiving chamber 218 at the bottom of the casing.

Instead of the exposed section of sensitized paper being moved progressively around a developing chamber to receive in succession atomized sprays of developing, washing, and fixing solutions, the exposed portion of the paper is held in a stationary position within the developing chamber 215 and sprays of developing, washing and fixing solutions are successively directed against its sensitized surface, such operation being carried on by means of a cam disk 219, carrying suitably positioned cams 220, actuating in timed relation a series of levers 221, operating air valves 222, which serve to release compressed air from an air chamber 223, extending transversely of the casing adjacent its rearward wall. The air chamber thus supplies air to a series of air conduits 224, having their discharge orificed 225, positioned in the rearward portion of the developing chamber 215. The chemical supply conduits receive chemicals from a series of inverted bottles or reservoirs 227, which maintain a liquid level at approximately the level of the discharge orifices 232 of the chemical supply conduits 226. Thus, when an air jet is forced across the discharge orifice of the chemical supply tube it will have an aspirator action upon the liquid within the tube and will transform the liquid into an atomized spray which will be projected with considerable force against the sensitized surface of the paper positioned adjacent thereto. The operation of the apparatus will be continued through the successive projection of atomized spray of developer solution, washing solution, fixing solution and additional washing solution.

A suitable drain 230 is provided to remove surplus surface liquid from the bottom of the developing chamber 215, the drain being connected to a suitable point of discharge.

As has been indicated, the motor is supported in the base of the apparatus and actuates the cam shaft 211 and also actuates an air pump 231 from which an air line 228 extends to the air chamber 223 heretofore referred to.

The apparatus is readily serviced by supplying fresh bottles of chemical solution to the chemical supply conduits, which project from the rearward wall of the casing.

The entire apparatus is timed to operate successively in the manner just described, and as each picture is finished and dropped into the delivery chamber 218, the finished portrait can be removed therefrom by the person who is operating the machine.

Whether the machine is used for self-portraiture alone or in combination with the identification, indicia, each type of apparatus is adapted to carry out a series of steps of moving the sensitized film to position, exposing such film and thereafter developing the exposed area of sensitized material, and moving it to a point of delivery after the developing and finishing operations are completed.

The simplified form of apparatus, illustrated in Figs. 22 and 24, may be actuated by any preferred coin operated mechanism and will continue to operate until the supply of sensitized paper has been fully used. As stated, the servicing of the apparatus is very readily carried out as the dome shaped cover 229 may be raised and a new roll of sensitized paper 203 may be inserted in its support above the casing, with its free end engaged between the feed rolls 205—206, and the bottles of chemical solution may be replaced by removing the empty bottles and inserting filled bottles in inverted position at the rear of the machine as may be required. Thus the operation of servicing the machine may be carried out by an attendant who is not particularly skilled, as all parts are very readily accessible, and the apparatus may be depended on to carry through its cycle of operations so long as it is supplied with sensitized strip material and the chemical solutions heretofore referred to.

Other modes of applying the principle of my invention may be employed instead of those explained, change being made as regards the mechanism herein disclosed, provided the means stated by any of the following claims or the equivalent of such stated means be employed.

I, therefore, particularly point out and distinctly claim as my invention:

1. An automatic photographic apparatus having a developing and finishing chamber comprising an annular series of compartments holding liquid for developing and finishing identification units, such series of compartments being held in fixed position centrally within said chamber, a rotor within said chamber carrying a plurality of nozzles, said rotor and nozzles being moved progressively over on said compartments to project liquid from said compartments by means of an air jet discharged from said nozzle, and means carried by said rotor for supporting an exposed unit of sensitized material in line with each nozzle for successively receiving the projected liquid spray from said compartments for developing and finishing the same.

2. An apparatus of the character described having in combination means for developing and finishing an exposed unit of sensitized photographic material which includes a series of compartments adapted to contain developing, fixing, and washing solutions arranged around a circular chamber, a rotor including means for transporting a unit of exposed photographic material through said circular chamber in a substantially circular path, said rotor also carrying a plurality of air jet nozzles movable over said compartments in successive positions to project films of liquid against said exposed unit progressively from each compartment, means to release said unit from said rotor after it has received the series of liquid coatings in passing through said chamber, and means for discharging said unit from the chamber.

3. An apparatus of the character described having in combination means for developing and finishing an exposed unit of sensitized photographic material which includes a series of compartments adapted to contain developing, fixing, and washing solutions arranged around a circular chamber, a rotor including means for transporting a unit of exposed photographic material through said circular chamber in a substantially circular path, said rotor also carrying a plurality of air jet nozzles each having a flat terminal portion and a plurality of air passageways at the end thereof whereby a sheet of liquid is projected against said sensitized material progressively from each compartment, means to release such area of sensitized material from the rotor after it has received the series of liquid coatings in passing through said chamber, and means for discharging said unit of sensitized material from said chamber.

JOSEPH E. KLEIN.

REFERENCES CITED

The following references are of record in the file of this patent:

UNITED STATES PATENTS

| Number | Name | Date |
|---|---|---|
| 1,682,931 | Pifier | Sept. 4, 1928 |
| 1,862,190 | McCowan | June 7, 1932 |
| 1,877,659 | Greene | Sept. 13, 1932 |
| 1,911,115 | Greene | May 23, 1933 |
| 2,117,279 | Anson | May 17, 1938 |
| 2,125,388 | Monroe | Aug. 2, 1938 |
| 2,351,399 | Caracciola | June 13, 1944 |
| 2,378,217 | Hansen | June 12, 1945 |